US012548346B2

(12) United States Patent
Zhao et al.

(10) Patent No.: US 12,548,346 B2
(45) Date of Patent: Feb. 10, 2026

(54) TARGET OBJECT DETECTION METHOD AND APPARATUS, AND READABLE STORAGE MEDIUM

(71) Applicant: Xiaomi EV Technology Co., Ltd., Beijing (CN)

(72) Inventors: Houlong Zhao, Beijing (CN); Kuiyuan Yang, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 709 days.

(21) Appl. No.: 17/877,054

(22) Filed: Jul. 29, 2022

(65) Prior Publication Data

US 2023/0306750 A1 Sep. 28, 2023

(30) Foreign Application Priority Data

Mar. 28, 2022 (CN) ........................ 202210314709.3

(51) Int. Cl.
*G06V 20/58* (2022.01)
*G06T 7/73* (2017.01)
(Continued)

(52) U.S. Cl.
CPC ................ *G06V 20/58* (2022.01); *G06T 7/73* (2017.01); *G06V 10/806* (2022.01); *G06V 20/588* (2022.01); *G06T 2207/20081* (2013.01); *G06T 2207/30256* (2013.01); *G06T 2207/30261* (2013.01)

(58) Field of Classification Search
CPC .... G06V 20/58; G06V 10/806; G06V 20/588; G06V 20/56; G06T 7/73; G06T 2207/20081; G06T 2207/30256; G06T 2207/30261; Y02T 10/40
See application file for complete search history.

(56) References Cited

U.S. PATENT DOCUMENTS

2019/0180115 A1* 6/2019 Zou ..................... G06N 3/0464

FOREIGN PATENT DOCUMENTS

CN 110889829 A 3/2020
CN 111559314 A 8/2020
(Continued)

OTHER PUBLICATIONS

Plaut E, Ben Yaacov E, El Shlomo B, “3D Object Detection from a Single Fisheye Image Without a Single Fisheye Training Image”, Proceedings of the IEEE/CVF Conference on Computer Vision and Pattern Recognition, May 31, 2021.
(Continued)

*Primary Examiner* — Mekonen T Bekele
(74) *Attorney, Agent, or Firm* — Volpe Koenig

(57) ABSTRACT

A target object detection method, including: obtaining images collected by more than one camera installed on a target vehicle; determining a high-dimensional parameter feature in a high-dimensional space corresponding to parameter information of each camera; and fusing features of the images via a target object detection model according to the high-dimensional parameter features, and determining position information of a target object based on the fused features, an order of the cameras corresponding to the images being the same as an order of the cameras corresponding to the high-dimensional parameter features.

14 Claims, 3 Drawing Sheets obtaining images collected by more than one camera installed on a target vehicle — 11

Determine a high-dimensional parameter feature in a high-dimensional space corresponding to parameter information of each camera — 12

Fuse features of the images via a target object detection model according to the high-dimensional parameter features, and determine position information of a target object based on the fused features — 13

Parameter information → Parameter mapping model → High-dimensional parameter feature
Image → Feature extraction sub-model 201 → Two-dimensional feature → Feature conversion sub-model 202 → Three-dimensional feature → Feature encoding sub-model 203 → Feature decoding sub-model 204 → BEV feature → Position information

(51) Int. Cl.
*G06V 10/80* (2022.01)
*G06V 20/56* (2022.01)

(56) References Cited

FOREIGN PATENT DOCUMENTS

| | | | | | |
|---|---|---|---|---|---|
| CN | 111583337 A | * | 8/2020 | ........... | G06F 18/214 |
| CN | 112308927 A | | 2/2021 | | |
| CN | 110276293 B | * | 7/2021 | ............ | G06F 18/24 |
| CN | 113313813 A | | 8/2021 | | |
| CN | 113723216 A | | 11/2021 | | |
| CN | 113870221 A | | 12/2021 | | |

OTHER PUBLICATIONS

Yue Wang et al, "DETR3D: 3D Object Detection from Multi-view Images via 3D-to-2D Queries", arxiv.org, Cornell University Library, 201OLIN Library Cornell University Ithaca, NY14853, Oct. 13, 2021, XP091077242.

Philion Jonah et al., "Lift, Splat, Shoot: Encoding Images from Arbitrary Camera Rigs by Implicitly Unprojecting to 3D", Nov. 13, 2020 , 16th European Conference—Computer Vision—ECCV 2020, pp. 194-210, XP047588631.

Rui Zeng et al, "Geometry-constrained Car Recognition Using a 3D Perspective Network", arxiv.org, Cornell University Library, 201OLIN Library Cornell University Ithaca, NY14853, Mar. 19, 2019, XP081533387.

Extended European Search Report issued on Jul. 27, 2023 for European Patent Application No. 22187747.5.

* cited by examiner

TARGET OBJECT DETECTION METHOD AND APPARATUS, AND READABLE STORAGE MEDIUM

CROSS-REFERENCE TO RELATED APPLICATION

The present application claims the benefit of priority to Chinese Application No. 202210314709.3, filed on Mar. 28, 2022, the contents of which are incorporated herein by reference in their entirety for all purposes.

BACKGROUND

Fisheye lenses are widely used in the field of autonomous driving due to their large field of view and the capacity to view areas closer to a vehicle to which the fisheye lenses belong.

SUMMARY

The present disclosure relates to the field of image processing, in particular to a target object detection method and apparatus, and a readable storage medium.

According to a first aspect of examples of the present disclosure, there is provided a target object detection method, including:

- obtaining images collected by more than one camera installed on a target vehicle;
- determining a high-dimensional parameter feature in a high-dimensional space corresponding to parameter information of each camera; and
- fusing features of the images via a target object detection model according to the high-dimensional parameter feature, and determining position information of a target object based on the fused features, where an order of the cameras corresponding to the images is the same as an order of the cameras corresponding to the high-dimensional parameter features.

According to a second aspect of examples of the present disclosure, there is provided a target object detection apparatus, including:

- an obtaining module, configured to obtain images collected by more than one camera installed on a target vehicle;
- a first determining module, configured to determine a high-dimensional parameter feature in a high-dimensional space corresponding to parameter information of each camera; and
- a second determining module, configured to fuse features of the images via a target object detection model according to the high-dimensional parameter features, and to determine position information of a target object based on the fused features, where an order of the cameras corresponding to the images is the same as an order of the cameras corresponding to the high-dimensional parameter features.

According to a third aspect of examples of the present disclosure, there is provided a target object detection apparatus, including:

- a processor; and
- a memory, configured to store processor-executable instructions;
- the processor is configured to:
- obtain images collected by more than one camera installed on a target vehicle;

- determine a high-dimensional parameter feature in a high-dimensional space corresponding to parameter information of each camera; and
- fuse features of the images via a target object detection model according to the high-dimensional parameter features, and determine position information of a target object based on the fused features, where an order of the cameras corresponding to the images is the same as an order of the cameras corresponding to the high-dimensional parameter features.

According to a fourth aspect of examples of the present disclosure, there is provided a non-transitory computer-readable storage medium. Computer program instructions are stored on the computer-readable storage medium. The program instructions, when executed by a processor, implement the steps of any target object detection method provided in the first aspect.

It should be understood that the above general descriptions and later detailed descriptions are examples and illustrations, and cannot limit the present disclosure.

BRIEF DESCRIPTION OF THE DRAWINGS

The accompanying drawings, which are incorporated in and constitute a part of the specification, illustrate examples consistent with the present disclosure and together with the specification serve to explain the principles of the present disclosure.

DETAILED DESCRIPTION

Examples will be described in detail, instances of which are illustrated in the accompanying drawings. When the following description refers to the accompanying drawings, unless otherwise indicated, the same numbers in different drawings indicate the same or similar elements. The implementations described in the following examples do not represent all implementations consistent with the present disclosure. Rather, they are instances of apparatuses and methods consistent with some aspects of the present disclosure as detailed in the appended claims.

It should be noted that all actions of obtaining signals, information or data in the present disclosure are carried out under the premise of complying with the corresponding data protection regulations and policies of the local country, and with the authorization of owners of corresponding apparatuses.

There exists large distortion in the fisheye images collected by the fisheye lenses. In the related art, de-distortion operation is usually performed on all or part of key points in the fisheye images during application, and image recognition is performed based on images obtained by de-distortion. However, the images obtained by de-distortion have a small field of view, losing the characteristic advantage of the fisheye lenses. In other way, the fisheye images are mapped into spherical or cylindrical images, which causes the fisheye images to be partially cropped, losing part of features in the images.

Figure 1:
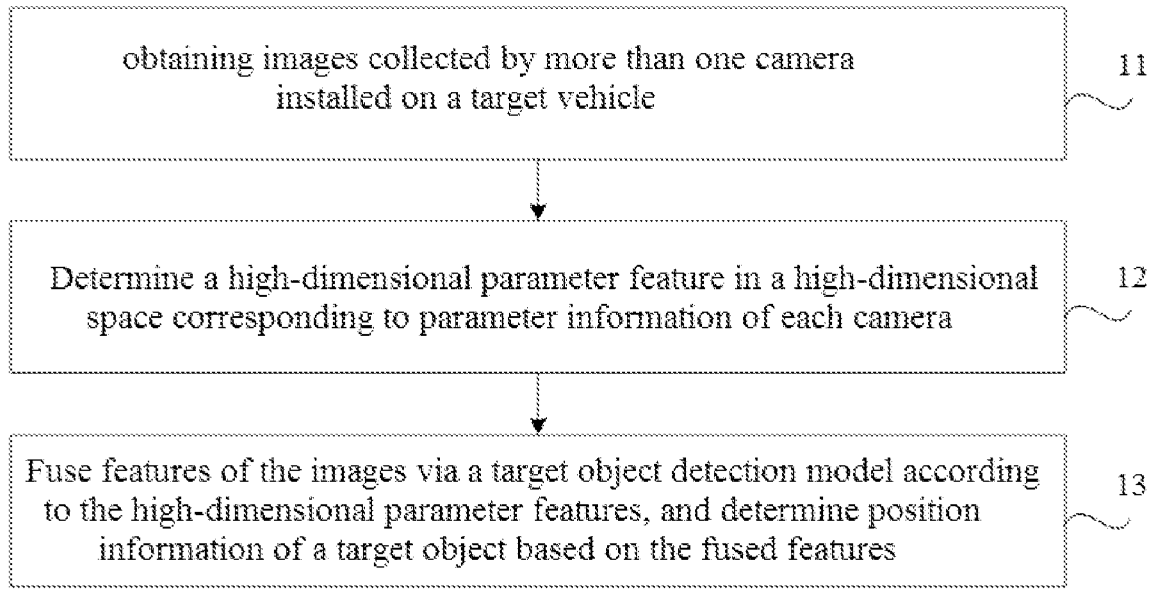
FIG. 1 is a flow diagram of a target object detection method according to an example.

FIG. 1 is a flow diagram of a target object detection method according to an example. As shown in FIG. 1, the method may include the following steps.

In step 11, images collected by more than one camera installed on a target vehicle are obtained.

The more than one camera may be installed in the target vehicle so that more information around the target vehicle may be obtained. The cameras may be pinhole lenses and fisheye lenses commonly used in vehicles. For example, the cameras may all be pinhole lenses. Alternatively, at least one of the cameras may be a fisheye lens. The cameras may all be fisheye lenses, or may be a combination of fisheye lenses and pinhole lenses. Since the distortion parameters of each position in images collected by the fisheye lens are different, the method of the present disclosure is suitable for processing the images collected by the fisheye lens, and may process the images more accurately.

For example, four fisheye lenses may be installed at suitable positions on the vehicle to capture images of all areas around the vehicle, so that all-round monitoring around the vehicle is realized. The number of cameras installed and the installation position of each camera may be set according to actual application scenarios, and are not limited in the present disclosure.

In step 12, a high-dimensional parameter feature in a high-dimensional space corresponding to parameter information of each camera is determined. For example, the parameter information may include shooting parameters and installation parameters of the cameras. The shooting parameters may be factory configuration parameters of the cameras. The installation parameters may be installation position information, rotation angle information, etc. of the cameras relative to the target vehicle.

Information in the images that may be collected by the cameras is related to the installation position of the cameras, so the parameter information of the cameras may be further obtained, so as to process the images collected by the corresponding cameras based on the parameter information.

After the cameras are installed on the vehicle, the installation position information and rotation angle information of the cameras relative to the target vehicle, namely position coordinates of the cameras in a vehicle coordinate system corresponding to the target vehicle and a rotation angle at this position, may be determined. In this way, positions corresponding to the images collected by the cameras may be determined, so that position information of a target object in the images can be converted into the vehicle coordinate system.

For example, the shooting parameters of the cameras may be factory parameters of the cameras, such as internal parameter matrix, focal length, dx and dy, etc. dx and dy represent how many units a pixel in the x-direction and y-direction occupies, respectively, so as to reflect the conversion of an image physical coordinate system in reality and an image coordinate system. The shooting parameters are calibrated when the corresponding cameras leave the factory, and may be obtained from configuration information of the cameras. The shooting parameters may be all of the configuration information, or part of the configuration information selected according to actual application scenarios, which is not limited to the present disclosure.

In the example, the cameras may be fisheye lenses or pinhole lenses. Since configuration information corresponding to the fisheye lenses includes distortion parameters, the shooting parameters further include the distortion parameters corresponding to the fisheye lenses. If no distortion parameter is calibrated in the configuration information corresponding to the pinhole lenses, the distortion parameter may be set to 0 by default.

In step 13, features of the images are fused via a target object detection model according to the high-dimensional parameter features, and the position information of the target object is determined based on the fused features. An order of the cameras corresponding to the images is the same as an order of the cameras corresponding to the high-dimensional parameter features.

An arrangement order of the more than one camera installed on the target vehicle may be preset, so that the images corresponding to the more than one camera may be sorted based on the arrangement order, and the high-dimensional parameter features corresponding to the cameras may be sorted based on the arrangement order. In this way, the corresponding relationship between the input images in the target object detection model and the high-dimensional parameter features may ensure the accuracy of data processing.

In the above technical solution, the images collected by the more than one camera installed on the target vehicle are obtained, the high-dimensional parameter features corresponding to the parameter information of the more than one camera are obtained, the features of the images are fused based on the high-dimensional parameter features and the target object detection model, and a detection result for the target object is obtained based on the fused features. In this way, by mapping the parameter information corresponding to the cameras to the representation in a higher dimension, the high-dimensional parameter features have information redundancy compared with the parameter information, adapting to nonlinear transformation of features under the fisheye lenses, ensuring the accuracy of processing on the images obtained by the fisheye lenses, and improving the accuracy of target object detection. By fusing the more than one image in a feature dimension, the fused features in a high-level semantics of the images can be obtained, the robustness of target object detection based on the target object detection model can be improved, and the application scope of target object detection can be expanded.

Figure 2:
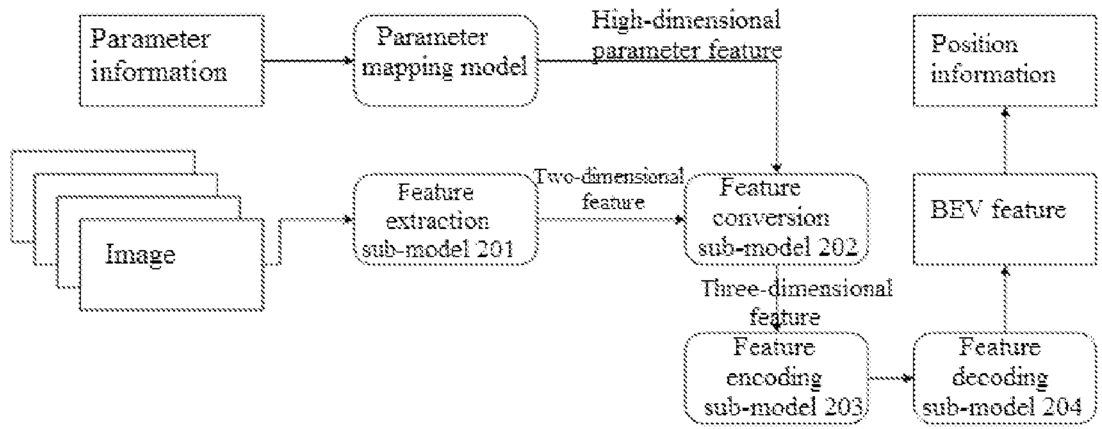
FIG. 2 is a schematic structural diagram of a target object detection model according to an example.

In an example, as shown in FIG. 2, the target object detection model includes: a feature extraction sub-model 201, a feature conversion sub-model 202, a feature encoding sub-model 203, and a feature decoding sub-model 204. Each sub-model will be described in detail below.

The feature extraction sub-model 201 is configured to obtain two-dimensional features corresponding to the images by performing feature extraction on the images. The feature extraction sub-model may be a basic network, such as a convolutional neural network, so as to obtain the two-dimensional features by performing, based on the network, the feature extraction on the input images.

The feature conversion sub-model 202 is configured to obtain three-dimensional features by performing feature conversion according to the two-dimensional features and the high-dimensional parameter features.

As mentioned above, the high-dimensional parameter features are a feature representation of the parameter information of the cameras in a higher dimension, and may achieve a more comprehensive feature representation for the parameter information. In this way, the feature conversion may be performed based on the high-dimensional parameter features corresponding to the cameras, that is, features in the obtained two-dimensional images are converted into a three-dimensional stereo space based on the parameter information of the cameras.

For example, the feature conversion sub-model 202 may be a multilayer perceptron (MLP). The feature conversion sub-model may obtain the three-dimensional features by performing the feature conversion according to the two-dimensional features and the high-dimensional parameter features in the following manner:

assigning values to parameters in the feature conversion sub-model according to the high-dimensional parameter features; and obtaining the three-dimensional features by performing the feature conversion on the two-dimensional features according to the assigned feature conversion sub-model.

The high-dimensional parameter features may include each weight parameter and each bias parameter in the MLP model, so that values of the parameters of the MLP model may be determined by assigning the values to the parameters in the MLP model one by one based on the high-dimensional parameter features. The MLP model includes an input layer, a hidden layer, and an output layer. There may be more than one hidden layer. In the MLP model, the layers are fully connected. The input layer is represented by a vector X, and an output of the hidden layer is $f(w_1 \cdot X+b_1)$, where $w_1$ is a weight parameter, $b_1$ is a bias parameter, and a function f may be a sigmoid function or tanh function commonly used in the art. Connection between other layers is similar, which is not repeated in the present disclosure. In this way, in the example of the present disclosure, the feature conversion sub-model corresponding to the currently input images is obtained by assigning values to each weight parameter and each bias parameter used for feature processing during transfer between the layers of the MLP model.

In this way, the values of the parameters in the MLP model are matched with the parameter information of the cameras corresponding to the images actually input into the target object detection model, so that when the feature conversion is performed on the input two-dimensional features based on the MLP model. Processing may be performed based on the high-dimensional parameter features corresponding to the corresponding cameras, ensuring the accuracy of feature conversion, improving feature consistency between the three-dimensional features obtained by conversion and the two-dimensional features, ensuring feature matching between the three-dimensional features and original input images, improving the accuracy of the three-dimensional features, and providing effective and accurate data support for subsequent target object detection.

The feature encoding sub-model 203 is configured to obtain the fused features by encoding the three-dimensional features. The two-dimensional features are used to represent features of the input images in an image coordinate system. The three-dimensional features may include features of the input images in the vehicle coordinate system corresponding to the target vehicle. Due to the fact that different cameras are installed at different positions, images that may be collected by the cameras are also different in content. In the example, the different images collected by the more than one camera may be fused in the feature dimension, so as to avoid ignoring texture, color and other features in the images during fusion based on perceptual results corresponding to each image, so that comprehensiveness and accuracy of the features in the obtained fused features are ensured, and reliable data support is further provided for subsequent target object recognition.

In the images collected based on the fisheye lenses, different positions in the images correspond to different distortion parameters generally. Based on this, the present disclosure provides the following examples. For example, the feature encoding sub-model 203 is an encoder of a Transformer model. The feature encoding sub-model obtains the fused features by encoding the three-dimensional features in the following manner:

obtaining more than one sub-feature of equal size by performing feature division on the three-dimensional features; and obtaining the fused features by performing, according to a feature vector corresponding to each sub-feature and a position vector corresponding to each sub-feature, the feature fusion on the feature vectors.

The Transformer model is an architecture for processing sequence-to-sequence problems, and for processing the two-dimensional images in the example, and may convert the two-dimensional images into a one-dimensional sequence. More than one small block of equal size, namely the sub-features, may be obtained by performing the feature division on the three-dimensional features corresponding to the images, and a sequence formed by the more than one sub-feature may be used as an input sequence of the encoder. The size of the feature division may be preset according to an actual application scenario, which is not limited to the present disclosure.

Then, the embedding, namely the feature vector, may be obtained by linearly changing each sub-feature. Position coding information is added to all the small blocks, that is, the position vector corresponding to each sub-feature is obtained. The position coding information is initialized as a random number, and then may be learned through training.

In the process of encoding by the encoder of the Transformer model, more than one sub-feature map may be obtained by dividing three-dimensional feature images, and encoding is performed based on an attention mechanism, which may break the limitation of space. Furthermore, by performing the feature fusion in combination with the position vector of each sub-feature, corresponding spatial position information may be retained, which fits the scenario where different positions in the images obtained by the fisheye lenses correspond to different distortion parameters. In this way, the accuracy and precision of fusion of the features of the images obtained by the fisheye lenses is ensured, narrowing of the field of view due to de-distortion is avoided, and the comprehensiveness of features in the fused features and the effectiveness of corresponding field of view features are provided.

The feature decoding sub-model 204 is configured to obtain the position information by decoding the fused features. For example, the feature decoding sub-model may be a decoder of the Transformer model, and a structure and decoding manner of the feature decoding sub-model may be implemented by using a common decoder model in the art, which will not be repeated here. Corresponding decoded features may be obtained by decoding the fused features. The fused features are obtained by fusion based on the three-dimensional features, and in this way, the decoded features obtained by decoding may be bird's eye view (BEV) features in a BEV space, and the corresponding position information is obtained by performing conversion via the output layer based on the BEV features. The output layer may be implemented based on an output layer corresponding to a classification network, for example, based on softmax processing of the BEV features.

In this way, through the above technical solution, feature extraction, feature conversion and feature fusion of the collected images may be realized based on each sub-model in the target object detection model, so that the position information of the target object may be obtained based on the fused features. Target object detection may be performed based on images around the vehicle from different perspectives, and the detection result for the target object in the vehicle coordinate system may be output directly, so that the usability of the detection result in a vehicle system is improved while the accuracy of the detection result for the target object is improved, effective data support is provided for decision making of autonomous driving, and safe driving is ensured.

In an example, the target object detection model is trained in the following manner.

A training sample set is obtained. Each training sample in the training sample set includes an input image sequence, training parameter information of a camera corresponding to each image in the input image sequence, and target position information corresponding to the input image sequence. The input image sequence may include a sequence of the images collected by the more than one camera installed on the trained vehicle. The training parameter information corresponding to the cameras is similar to the parameter information of the cameras in step 12, which will not be repeated here. The target position information corresponding to the input image sequence may be position information, pre-marked by a worker, of an object to be detected.

High-dimensional parameter features corresponding to the training parameter information are obtained by inputting the training parameter information into a parameter mapping model. The parameter mapping model may be an MLP model. For example, the parameter mapping model as shown in FIG. 2 is configured to generate the high-dimensional parameter features in the high-dimensional space based on the input training parameter information. The high-dimensional parameter features include the value of each parameter in the feature conversion sub-model, that is, the parameter mapping model is configured to determine the value of each parameter in the feature conversion sub-model based on the training parameter information of the cameras.

The input image sequence and the high-dimensional parameter features corresponding to the training parameter information are input into a preset model, and the predicted position information output by the preset model is obtained. The structure of the preset model is the same as the structure of the target object detection model, and the implementation manner of this step is similar to the manner of determining the position information of the target object described above, which will not be repeated here.

A target loss is determined according to the target position information and the predicted position information. The parameter mapping model and the preset model are trained according to the target loss, and the trained preset model is determined as the target object detection model.

Loss calculation methods commonly used in the art may be used for calculation, for example, a cross-entropy loss, which is not limited here. For example, under the condition that the target loss is greater than a loss threshold, parameters of the parameter mapping model and parameters of the preset model may be updated based on the target loss, for example, updated based on a gradient descent method. For another example, parameter update may be performed based on the target loss under the condition that the number of training times is less than a times threshold.

In this way, through the above technical solution, the parameter mapping model and the preset model may be trained simultaneously, on the one hand, the training cost may be reduced, and on the other hand, the matching degree between the trained parameter mapping model and target object detection model may be ensured, and the accuracy of the target object detection model may be improved.

For example, determining the high-dimensional parameter feature in the high-dimensional space corresponding to the parameter information of each camera may include: obtaining the high-dimensional parameter features corresponding to the parameter information by inputting the obtained parameter information into the trained parameter mapping model.

For another example, determining the high-dimensional parameter features in the high-dimensional space corresponding to the parameter information of each camera includes:

obtaining the high-dimensional parameter features corresponding to the parameter information according to the parameter information and a high-dimensional parameter mapping relationship table, where the high-dimensional parameter mapping relationship table is generated in the following manner:

obtaining the high-dimensional parameter features output by the trained parameter mapping model by inputting preset parameter information of the cameras into the trained parameter mapping model; and obtaining the high-dimensional parameter mapping relationship table by generating a corresponding relationship between the parameter information input into the trained parameter mapping model and the high-dimensional parameter features output by the trained parameter mapping model.

The type and position of the cameras installed in the vehicle are usually constant. Based on this, a mapping relationship under various installation types may be determined in advance according to the type and installation position information of the cameras.

For example, more than one installation mode of the cameras may be preset based on application scenarios. For example, installation position information corresponding to a camera $C_1$ is $D_1(p_1, r_1)$, $p_1$ represents the installation position information of the camera $C_1$ in the vehicle, $r_1$ represents rotation angle information of the camera $C_1$ installed inside the vehicle, and $H_1$ represents shooting parameters of the camera $C_1$. A high-dimensional parameter feature $G_1$ corresponding to the parameter information $p_1$, $r_1$, and $H_1$ may be obtained by inputting the parameter information $p_1$, $r_1$, and $H_1$ into the parameter mapping model. Similarly, preset parameter information $p_2$, $r_2$, and $H_2$ of a camera $C_2$ are input into the parameter mapping model to obtain a high-dimensional parameter feature $G_2$ corresponding to the parameter information $p_2$, $r_2$, and $H_2$. In this way, the following n sets of correspondences, namely the high-dimensional parameter mapping table, may be obtained.

$$(p_1, r_1, H_1)->G_1$$
$$(p_2, r_2, H_2)->G_2$$
$$\ldots$$
$$(p_n, r_n, H_n)->G_n$$

For determining the high-dimensional parameter feature in the high-dimensional space corresponding to the parameter information of each camera, the high-dimensional parameter mapping table may be searched based on the parameter information of each camera, and the searched high-dimensional parameter features are taken as the high-dimensional parameter features corresponding to the parameter information instead of repeatedly generating the high-dimensional parameter features based on the parameter information and the parameter mapping model, so that the amount of data calculation is reduced, and the detection efficiency of the target object detection model and the real-time performance of target object detection may be improved.

In an example, the target object includes at least one of a three-dimensional obstacle, a three-dimensional lane line, or a three-dimensional driving area, so as to adapt to more than one application scenario under autonomous driving and further improve the scope of application of the target object detection method.

As mentioned above, under the condition that the target object is one of the three-dimensional obstacles, the three-dimensional lane line, or the three-dimensional driving area, the target position information in the training samples may be the target object during the training process. For example, the target object is the three-dimensional obstacle, training may be performed based on a training sample marked with the target position information of the obstacle. For another example, the target object is the three-dimensional lane line, training may be performed based on a training sample marked with the target position information of the three-dimensional lane line.

Under the condition that the target object includes more than one of the three-dimensional obstacles, the three-dimensional lane line, or the three-dimensional driving area, pre-training may be performed first based on a training sample marked with one of the three-dimensional obstacles, the three-dimensional lane line, or the three-dimensional driving area to obtain a pre-trained model. For example, the target object includes the three-dimensional obstacle and the three-dimensional lane line. Pre-training may be performed based on a training sample marked with the target position information of the obstacle, and the trained model is used as the pre-trained model. After pre-training, fine-tuning training may be further performed on the basis of the pre-trained model based on a training sample marked with the target position information of the three-dimensional lane line, so that a multi-task model that may output the position information of the three-dimensional obstacle and the three-dimensional lane line may be obtained. In this way, the training cost is reduced, training efficiency is improved, the accuracy of a detection result of the multi-task model is ensured, and user experience is improved.

Figure 3:
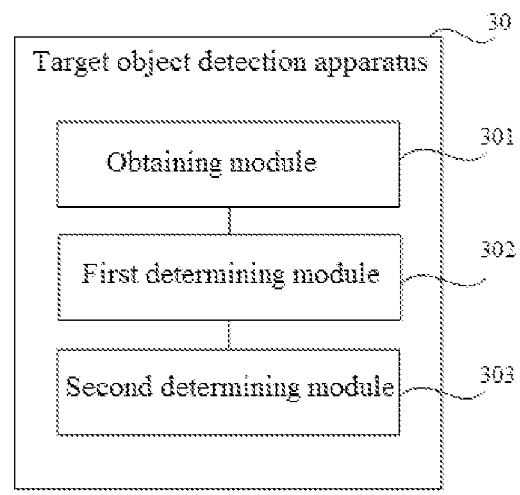
FIG. 3 is a block diagram of a target object detection apparatus according to an example.

The present disclosure further provides a target object detection apparatus. As shown in FIG. 3, the apparatus 30 includes an obtaining module 301, a first determining module 302, and a second determining module 303.

The obtaining module 301 is configured to obtain images collected by more than one camera installed on a target vehicle.

The first determining module 302 is configured to determine a high-dimensional parameter feature in a high-dimensional space corresponding to parameter information of each camera.

The second determining module 303 is configured to fuse features of the images via a target object detection model according to the high-dimensional parameter features, and to determine position information of a target object based on the fused features, where an order of the cameras corresponding to the images is the same as an order of the cameras corresponding to the high-dimensional parameter features.

In an example, the target object detection model includes: a feature extraction sub-model, a feature conversion sub-model, a feature encoding sub-model, and a feature decoding sub-model.

The feature extraction sub-model is configured to obtain two-dimensional features corresponding to the images by performing feature extraction on the images. The feature conversion sub-model is configured to obtain three-dimensional features by performing feature conversion according to the two-dimensional features and the high-dimensional parameter features. The feature encoding sub-model is configured to obtain the fused features by encoding the three-dimensional features. The feature decoding sub-model is configured to obtain the position information by decoding the fused features.

In an example, the feature encoding sub-model is an encoder of a Transformer model. The feature encoding sub-model obtains the fused features by encoding the three-dimensional features via the following modules:

- a division sub-module, configured to obtain more than one sub-feature of equal size by performing feature division on the three-dimensional features; and
- a fusion sub-module, configured to obtain the fused features by performing, according to a feature vector corresponding to each sub-feature and a position vector corresponding to each sub-feature, the feature fusion on the feature vectors.

In an example, the feature conversion sub-model is a multilayer perceptron. The feature conversion sub-model obtains the three-dimensional features by performing the feature conversion according to the two-dimensional features and the high-dimensional parameter features via the following modules:

- an assignment sub-module, configured to assign values to parameters in the feature conversion sub-model according to the high-dimensional parameter features; and
- a conversion sub-module, configured to obtain the three-dimensional features by performing the feature conversion on the two-dimensional features according to the assigned feature conversion sub-model.

In an example, the target object detection model is trained via the following training modules:

- an obtaining sub-module, configured to obtain a training sample set, each training sample in the training sample set including an input image sequence, training parameter information of a camera corresponding to each image in the input image sequence, and target position information corresponding to the input image sequence;
- a mapping sub-module, configured to obtain high-dimensional parameter features corresponding to the training parameter information by inputting the training parameter information into a parameter mapping model;
- a processing sub-module, configured to input the input image sequence and the high-dimensional parameter features corresponding to the training parameter information into a preset model, and obtain predicted position information output by the preset model;
- a determining sub-module, configured to determine, according to the target position information and the predicted position information, a target loss; and
- a training sub-module, configured to train the parameter mapping model and the preset model according to the target loss, and determine the trained preset model as the target object detection model.

In an example, determining the high-dimensional parameter features in the high-dimensional space corresponding to the parameter information of each camera includes:

obtaining the high-dimensional parameter features corresponding to the parameter information according to the parameter information and a high-dimensional parameter mapping relationship table, where the high-dimensional parameter mapping relationship table is generated in the following manner:

obtaining the high-dimensional parameter features output by the trained parameter mapping model by inputting preset parameter information of the cameras into the trained parameter mapping model; and obtaining the high-dimensional parameter mapping relationship table by generating a corresponding relationship between the parameter information input into the trained parameter mapping model and the high-dimensional parameter features output by the trained parameter mapping model.

In an example, the target object includes at least one of a three-dimensional obstacle, a three-dimensional lane line, or a three-dimensional driving area.

As for the apparatus in the above example, the manner in which each module performs operations has been described in detail in the method example, and detailed description will not be given here.

The present disclosure further provides a computer-readable storage medium, storing computer program instructions. The program instructions, when executed by a processor, implement the steps of the target object detection method provided by the present disclosure.

Figure 4:
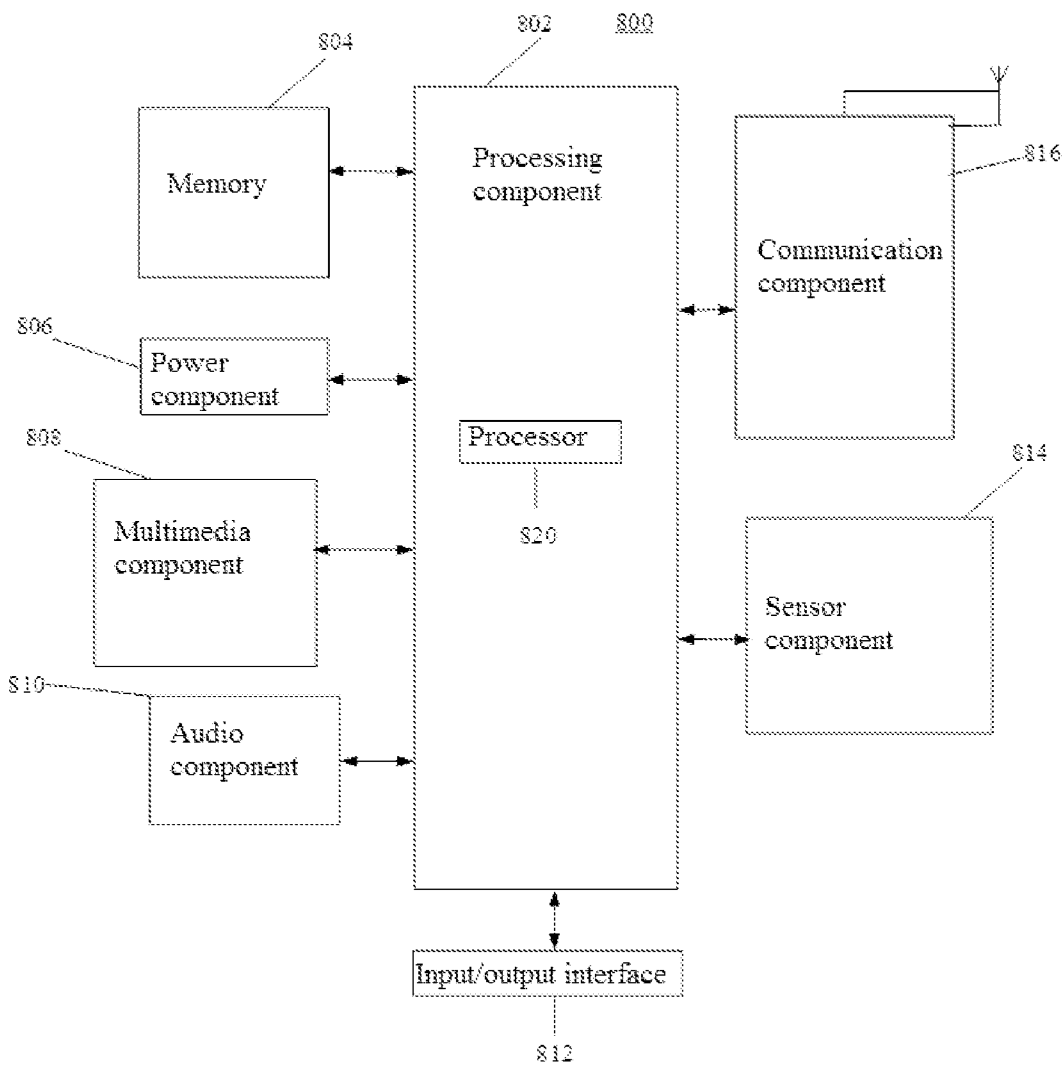
FIG. 4 is a block diagram of an apparatus for target object detection according to an example.

FIG. 4 is a block diagram of an apparatus 800 for target object detection according to an example. For example, the apparatus 800 may be a mobile phone, a computer, a digital broadcasting terminal, a messaging device, a game console, a tablet device, a medical device, a fitness device, a personal digital assistant, etc.

Referring to FIG. 4, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 controls the overall operation of the apparatus 800, such as operations associated with display, telephone call, data communication, camera operations, and recording operations. The processing component 802 may include one or more processors 820 to execute instructions to complete all or part of the steps of the above target object detection method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the apparatus 800. Instances of these data include instructions for any application or method operating on the apparatus 800, contact data, phonebook data, messages, pictures, videos, etc. The memory 804 may be implemented by any type of volatile or nonvolatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or a compact disk.

The power component 806 provides power for various components of the apparatus 800. The power component 806 may include a power management system, one or more power sources and other components associated with generating, managing and distributing power for the apparatus 800.

The multimedia component 808 includes a screen providing an output interface between the apparatus 800 and a user. In some examples, the screen may include a liquid crystal display (LCD) and a touch panel (TP). If the screen includes the touch panel, the screen may be implemented as a touch screen to receive an input signal from a user. The touch panel includes one or more touch sensors to sense touch, sliding, and gestures on the touch panel. The touch sensor can not only sense the boundary of the touch or sliding operation, but also detect the duration and pressure related to the touch or sliding operation. In some examples, the multimedia component 808 includes at least one of a front camera or a rear camera. When the apparatus 800 is in an operation mode, such as a shooting mode or a video mode, at least one of the front camera or the rear camera can receive external multimedia data. Each front camera and each rear camera can be a fixed optical lens system or have a focal length and optical zoom capability.

The audio component 810 is configured to output and/or input audio signals. For example, the audio component 810 includes a microphone (MIC) configured to receive an external audio signal when the apparatus 800 is in the operation mode, such as a call mode, a recording mode, and a speech recognition mode. The received audio signal may be further stored in the memory 804 or transmitted via the communication component 816. In some examples, the audio component 810 further includes a speaker for outputting an audio signal.

The I/O interface 812 provides an interface between the processing component 802 and a peripheral interface module which can be a keyboard, a click wheel, a button, etc. These buttons may include, but are not limited to: a home button, volume buttons, a start button, and a lock button.

The sensor component 814 includes one or more sensors for providing state evaluation of various aspects of the apparatus 800. For example, the sensor component 814 can detect an on/off state of the apparatus 800 and the relative positioning of the components, for example, the component is a display and a keypad of the apparatus 800. The sensor component 814 can also detect the change of the position of the apparatus 800 or one component of the apparatus 800, the presence or absence of user contact with the apparatus 800, the azimuth or acceleration/deceleration of the apparatus 800, and temperature change of the apparatus 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as WiFi, 2G, or 3G, or their combination. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the apparatus 800 may be implemented by one or more of application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above target object detection method.

In an example, a non-transitory computer-readable storage medium including instructions is further provided, for example, the memory 804 including instructions. The instructions may be executed by the processor 820 of the apparatus 800 to complete the above target object detection method. For example, the non-transitory computer-readable storage medium may be a ROM, a random access memory (RAM), a CD-ROM, a magnetic tape, a floppy disk, an optical data storage device, etc.

In another example, a computer program product is further provided. The computer program product includes a computer program executable by a programmable apparatus. The computer program has a code part which is configured to execute, when executed by the programmable apparatus, the above target object detection method.

Figure 5:
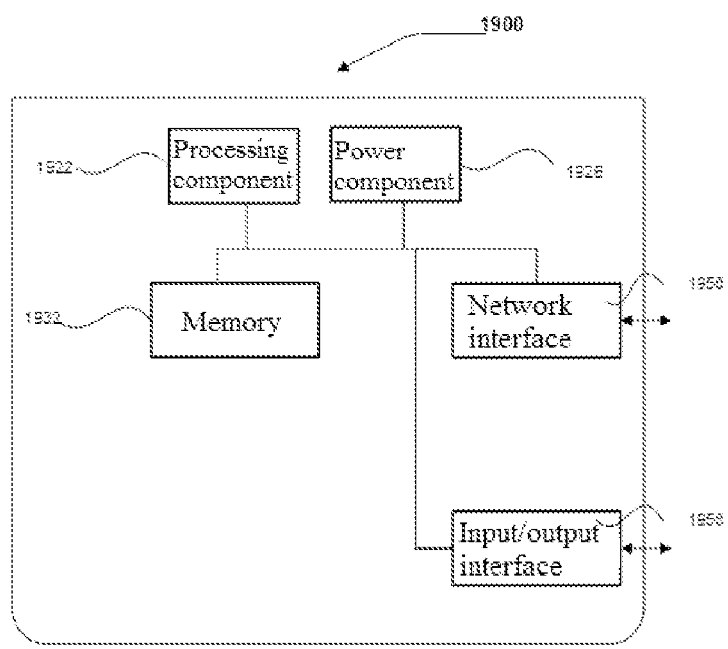
FIG. 5 is a block diagram of an apparatus for target object detection according to an example.

FIG. 5 is a block diagram of an apparatus 1900 for target object detection according to an example. For example, the apparatus 1900 may be provided as a server. Referring to FIG. 5, the apparatus 1900 includes a processing component 1922 which further includes one or more processors, and a memory resource represented by a memory 1932 for storing instructions executable by the processing component 1922, such as an application. The application stored in the memory 1932 may include one or more modules each corresponding to a set of instructions. In addition, the processing component 1922 is configured to execute instructions to perform the above target object detection method.

The apparatus 1900 may further include a power assembly 1926 configured to perform power management of the apparatus 1900, a wired or wireless network interface 1950 configured to connect the apparatus 1900 to a network, and an input/output (I/O) interface 1958. The apparatus 1900 may operate based on an operating system stored in the memory 1932, such as Windows Server™, Mac OS X™, Unix™, Linux™, FreeBSD™, or the like.

Additional non-limiting embodiments of the disclosure include the following.

According to a first aspect of examples of the present disclosure, there is provided a target object detection method, including:

obtaining images collected by more than one camera installed on a target vehicle;

determining a high-dimensional parameter feature in a high-dimensional space corresponding to parameter information of each camera; and fusing features of the images via a target object detection model according to the high-dimensional parameter feature, and determining position information of a target object based on the fused features, where an order of the cameras corresponding to the images is the same as an order of the cameras corresponding to the high-dimensional parameter features.

In an example, the target object detection model includes: a feature extraction sub-model, a feature conversion sub-model, a feature encoding sub-model, and a feature decoding sub-model.

The feature extraction sub-model is configured to obtain two-dimensional features corresponding to the images by performing feature extraction on the images; the feature conversion sub-model is configured to obtain three-dimensional features by performing feature conversion according to the two-dimensional features and the high-dimensional parameter features; the feature encoding sub-model is configured to obtain the fused features by encoding the three-dimensional features; and the feature decoding sub-model is configured to obtain the position information by decoding the fused features.

In an example, the feature encoding sub-model is an encoder of a Transformer model, and the feature encoding sub-model obtains the fused features by encoding the three-dimensional features in the following manner:

obtaining more than one sub-feature of equal size by performing feature division on the three-dimensional features; and obtaining the fused features by performing, according to a feature vector corresponding to each sub-feature and a position vector corresponding to each sub-feature, feature fusion on the feature vectors.

In an example, the feature conversion sub-model is a multilayer perceptron, and the feature conversion sub-model obtains the three-dimensional features by performing the feature conversion according to the two-dimensional features and the high-dimensional parameter features in the following manner:

assigning values to parameters in the feature conversion sub-model according to the high-dimensional parameter features; and obtaining the three-dimensional features by performing, according to the assigned feature conversion sub-model, the feature conversion on the two-dimensional features.

In an example, the target object detection model is trained in the following manner:

obtaining a training sample set, each training sample in the training sample set including an input image sequence, training parameter information of a camera corresponding to each image in the input image sequence, and target position information corresponding to the input image sequence;

obtaining high-dimensional parameter features corresponding to the training parameter information by inputting the training parameter information into a parameter mapping model;

inputting the input image sequence and the high-dimensional parameter features corresponding to the training parameter information into a preset model, and obtaining predicted position information output by the preset model;

determining, according to the target position information and the predicted position information, a target loss; and training the parameter mapping model and the preset model according to the target loss, and determining the trained preset model as the target object detection model.

In an example, determining the high-dimensional parameter feature in the high-dimensional space corresponding to the parameter information of each camera includes:

obtaining, according to the parameter information and a high-dimensional parameter mapping relationship table, the high-dimensional parameter features corresponding to the parameter information, where the high-dimensional parameter mapping relationship table is generated in the following manner:

inputting preset parameter information of the cameras into the trained parameter mapping model, and obtaining the high-dimensional parameter features output by the trained parameter mapping model; and obtaining the high-dimensional parameter mapping relationship table by generating a corresponding relationship between the parameter information inputted into the trained parameter mapping model and the high-dimensional parameter features output by the trained parameter mapping model.

In an example, the target object includes at least one of a three-dimensional obstacle, a three-dimensional lane line, or a three-dimensional driving area.

According to a second aspect of examples of the present disclosure, there is provided a target object detection apparatus, including:

an obtaining module, configured to obtain images collected by more than one camera installed on a target vehicle;

a first determining module, configured to determine a high-dimensional parameter feature in a high-dimensional space corresponding to parameter information of each camera; and a second determining module, configured to fuse features of the images via a target object detection model according to the high-dimensional parameter features, and to determine position information of a target object based on the fused features, where an order of the cameras corresponding to the images is the same as an order of the cameras corresponding to the high-dimensional parameter features.

According to a third aspect of examples of the present disclosure, there is provided a target object detection apparatus, including:

a processor; and a memory, configured to store processor-executable instructions;

the processor is configured to:

obtain images collected by more than one camera installed on a target vehicle;

determine a high-dimensional parameter feature in a high-dimensional space corresponding to parameter information of each camera; and fuse features of the images via a target object detection model according to the high-dimensional parameter features, and determine position information of a target object based on the fused features, where an order of the cameras corresponding to the images is the same as an order of the cameras corresponding to the high-dimensional parameter features.

According to a fourth aspect of examples of the present disclosure, there is provided a computer-readable storage medium. Computer program instructions are stored on the computer-readable storage medium. The program instructions, when executed by a processor, implement the steps of any target object detection method provided in the first aspect.

The technical solution provided by the examples of the present disclosure may include the following beneficial effects:

the images collected by the more than one camera installed on the target vehicle are obtained, the high-dimensional parameter features corresponding to the parameter information of the more than one camera are obtained, the features of the images are fused based on the high-dimensional parameter features and the target object detection model, and a detection result for the target object is obtained based on the fused features. In this way, by mapping the parameter information corresponding to the cameras to a representation in a higher dimension, the high-dimensional parameter features have information redundancy compared with the parameter information, adapting to nonlinear transformation of features under fisheye lenses, ensuring the accuracy of processing on images obtained by the fisheye lenses, and improving the accuracy of target object detection. By fusing the more than one image in a feature dimension, the fused features in a high-level semantics of the images can be obtained, the robustness of target object detection based on the target object detection model can be improved, and the application scope of target object detection can be expanded.

Other implementations of the present disclosure will be apparent to those skilled in the art from consideration of the specification and practice of the present disclosure. The disclosure is intended to cover any variations, uses, or adaptations of the disclosure following the general principles of the disclosure and including such departures from the disclosure as come within known or customary practice in the art. It is intended that the specification and examples be considered as examples, with a true scope and spirit of the present disclosure being indicated by the following claims.

It should be understood that the present disclosure is not limited to the exact construction that has been described above and illustrated in the accompanying drawings, and that various modifications and changes may be made without departing from the scope of the present disclosure. It is intended that the scope of the present disclosure be limited by the appended claims.

What is claimed is:

1. A method for target object detection, the method comprising:

obtaining images collected by cameras installed on a target vehicle;

determining a high-dimensional parameter feature in a high-dimensional space corresponding to parameter information of each camera among the cameras;

fusing features of the images via a trained target object detection model according to the high-dimensional parameter features; and determining position information of a target object based on the fused features, and wherein an order of the cameras corresponding to the images is the same as an order of the cameras corresponding to the high-dimensional parameter features;

wherein the trained target object detection model is trained by:

obtaining a training sample set, each training sample in the training sample set comprising an input image sequence, training parameter information of a camera corresponding to each image in the input image sequence, and target position information corresponding to the input image sequence, obtaining high-dimensional parameter features corresponding to the training parameter information by inputting the training parameter information into a parameter mapping model, inputting the input image sequence and the high-dimensional parameter features corresponding to the training parameter information into a preset model, and obtaining predicted position information output by the preset model, determining, according to the target position information and the predicted position information, a target loss, and training the parameter mapping model and the preset model according to the target loss to obtain a trained parameter mapping model and a trained preset model, and determining the trained preset model as the target object detection model;

wherein determining the high-dimensional parameter feature in the high-dimensional space corresponding to the parameter information of each camera among the cameras comprises:

obtaining, according to the parameter information and a high-dimensional parameter mapping relationship table, the high-dimensional parameter features corresponding to the parameter information;

wherein the high-dimensional parameter mapping relationship table being is generated by:

obtaining the high-dimensional parameter features output by the trained parameter mapping model by inputting preset parameter information of the cameras into the trained parameter mapping model; and obtaining the high-dimensional parameter mapping relationship table by generating a corresponding relationship between the parameter information input into the trained parameter mapping model and the high-dimensional parameter features output by the trained parameter mapping model.

2. The method according to claim 1, wherein the trained target object detection model comprises: a feature extraction sub-model, a feature conversion sub-model, a feature encoding sub-model, and a feature decoding sub-model, wherein, the feature extraction sub-model is configured to obtain two-dimensional features corresponding to the images by performing feature extraction on the images;

the feature conversion sub-model is configured to obtain three-dimensional features by performing feature conversion according to the two-dimensional features and the high-dimensional parameter features;

the feature encoding sub-model is configured to obtain the fused features by encoding the three-dimensional features; and the feature decoding sub-model is configured to obtain the position information by decoding the fused features.

3. The method according to claim 2, wherein the feature encoding sub-model is an encoder of a Transformer model, and the feature encoding sub-model obtains the fused features by:

obtaining more than one sub-feature of equal size by performing feature division on the three-dimensional features; and obtaining the fused features by performing, according to a feature vector corresponding to each sub-feature and a position vector corresponding to each sub-feature, the feature fusion on the feature vectors.

4. The method according to claim 2, wherein the feature conversion sub-model is a multilayer perceptron, and the feature conversion sub-model obtains the three-dimensional features by performing the feature conversion according to the two-dimensional features and the high-dimensional parameter features by:

assigning values to parameters in the feature conversion sub-model according to the high-dimensional parameter features; and obtaining the three-dimensional features by performing the feature conversion on the two-dimensional features according to the assigned feature conversion sub-model.

5. The method according to claim 1, wherein the target object comprises at least one of a three-dimensional obstacle, a three-dimensional lane line, or a three-dimensional driving area.

6. An apparatus for target object detection, the apparatus comprising:

a memory, configured to store processor-executable instructions; and one or more processors communicatively coupled to the memory, wherein the one or more processors are collectively configured to:

obtain images collected by cameras installed on a target vehicle, determine a high-dimensional parameter feature in a high-dimensional space corresponding to parameter information of each camera among the cameras, fuse features of the images via a trained target object detection model according to the high-dimensional parameter features, and determine position information of a target object based on the fused features, and wherein an order of the cameras corresponding to the images being the same as an order of the cameras corresponding to the high-dimensional parameter features;

wherein the trained target object detection model is trained by:

obtaining a training sample set, each training sample in the training sample set comprising an input image sequence, training parameter information of a camera corresponding to each image in the input image sequence, and target position information corresponding to the input image sequence, obtaining high-dimensional parameter features corresponding to the training parameter information by inputting the training parameter information into a parameter mapping model, inputting the input image sequence and the high-dimensional parameter features corresponding to the training parameter information into a preset model, and obtaining predicted position information output by the preset model, determining, according to the target position information and the predicted position information, a target loss, and training the parameter mapping model and the preset model according to the target loss to obtain a trained parameter mapping model and a trained preset model, and determining the trained preset model as the target object detection model;

wherein determining the high-dimensional parameter feature in the high-dimensional space corresponding to the parameter information of each camera among the cameras comprises:

obtaining, according to the parameter information and a high-dimensional parameter mapping relationship table, the high-dimensional parameter features corresponding to the parameter information, wherein the high-dimensional parameter mapping relationship table is generated by:

obtaining the high-dimensional parameter features output by the trained parameter mapping model by inputting preset parameter information of the cameras into the trained parameter mapping model; and obtaining the high-dimensional parameter mapping relationship table by generating a corresponding relationship between the parameter information input into the trained parameter mapping model and the high-dimensional parameter features output by the trained parameter mapping model.

7. The apparatus according to claim 6, wherein the trained target object detection model comprises: a feature extraction sub-model, a feature conversion sub-model, a feature encoding sub-model, and a feature decoding sub-model, wherein, the feature extraction sub-model is configured to obtain two-dimensional features corresponding to the images by performing feature extraction on the images;

the feature conversion sub-model is configured to obtain three-dimensional features by performing feature conversion according to the two-dimensional features and the high-dimensional parameter features;

the feature encoding sub-model is configured to obtain the fused features by encoding the three-dimensional features; and the feature decoding sub-model is configured to obtain the position information by decoding the fused features.

8. The apparatus according to claim 7, wherein the feature encoding sub-model is an encoder of a Transformer model, and the feature encoding sub-model obtains the fused features by:

obtaining more than one sub-feature of equal size by performing feature division on the three-dimensional features; and obtaining the fused features by performing, according to a feature vector corresponding to each sub-feature and a position vector corresponding to each sub-feature, the feature fusion on the feature vectors.

9. The apparatus according to claim 7, wherein the feature conversion sub-model is a multilayer perceptron, and the feature conversion sub-model obtains the three-dimensional features by performing the feature conversion according to the two-dimensional features and the high-dimensional parameter features by:

assigning values to parameters in the feature conversion sub-model according to the high-dimensional parameter features; and obtaining the three-dimensional features by performing the feature conversion on the two-dimensional features according to the assigned feature conversion sub-model.

10. The apparatus according to claim 6, wherein the target object comprises at least one of a three-dimensional obstacle, a three-dimensional lane line, or a three-dimensional driving area.

11. A non-transitory computer-readable storage medium, storing computer program instructions thereon, wherein the computer program instructions, when executed by a processor, cause the processor to execute a method comprising:

obtaining images collected by cameras installed on a target vehicle;

determining a high-dimensional parameter feature in a high-dimensional space corresponding to parameter information of each camera among the cameras;

fusing features of the images via a trained target object detection model according to the high-dimensional parameter features; and determining position information of a target object based on the fused features, and wherein an order of the cameras corresponding to the images is the same as an order of the cameras corresponding to the high-dimensional parameter features;

wherein the trained target object detection model is trained by:

obtaining a training sample set, each training sample in the training sample set comprising an input image sequence, training parameter information of a camera corresponding to each image in the input image sequence, and target position information corresponding to the input image sequence, obtaining high-dimensional parameter features corresponding to the training parameter information by inputting the training parameter information into a parameter mapping model, inputting the input image sequence and the high-dimensional parameter features corresponding to the training parameter information into a preset model, and obtaining predicted position information output by the preset model, determining, according to the target position information and the predicted position information, a target loss, and training the parameter mapping model and the preset model according to the target loss to obtain a trained parameter mapping model and a trained preset model, and determining the trained preset model as the target object detection model;

wherein determining the high-dimensional parameter feature in the high-dimensional space corresponding to the parameter information of each camera among the cameras comprises:

obtaining, according to the parameter information and a high-dimensional parameter mapping relationship table, the high-dimensional parameter features corresponding to the parameter information;

wherein the high-dimensional parameter mapping relationship table is generated by:

obtaining the high-dimensional parameter features output by the trained parameter mapping model by inputting preset parameter information of the cameras into the trained parameter mapping model; and obtaining the high-dimensional parameter mapping relationship table by generating a corresponding relationship between the parameter information input into the trained parameter mapping model and the high-dimensional parameter features output by the trained parameter mapping model.

12. The non-transitory computer-readable storage medium according to claim 11, wherein the trained target object detection model comprises: a feature extraction sub-model, a feature conversion sub-model, a feature encoding sub-model, and a feature decoding sub-model, wherein, the feature extraction sub-model is configured to obtain two-dimensional features corresponding to the images by performing feature extraction on the images;

the feature conversion sub-model is configured to obtain three-dimensional features by performing feature conversion according to the two-dimensional features and the high-dimensional parameter features;

the feature encoding sub-model is configured to obtain the fused features by encoding the three-dimensional features; and the feature decoding sub-model is configured to obtain the position information by decoding the fused features.

13. The non-transitory computer-readable storage medium according to claim 12, wherein the feature encoding sub-model is an encoder of a Transformer model, and the feature encoding sub-model obtains the fused features by:

obtaining more than one sub-feature of equal size by performing feature division on the three-dimensional features; and obtaining the fused features by performing, according to a feature vector corresponding to each sub-feature and a position vector corresponding to each sub-feature, the feature fusion on the feature vectors.

14. The non-transitory computer-readable storage medium according to claim 12, wherein the feature conversion sub-model is a multilayer perceptron, and the feature conversion sub-model obtains the three-dimensional features by performing the feature conversion according to the two-dimensional features and the high-dimensional parameter features by:

assigning values to parameters in the feature conversion sub-model according to the high-dimensional parameter features; and obtaining the three-dimensional features by performing the feature conversion on the two-dimensional features according to the assigned feature conversion sub-model.

* * * * *